United States Patent Office 2,989,488
Patented June 20, 1961

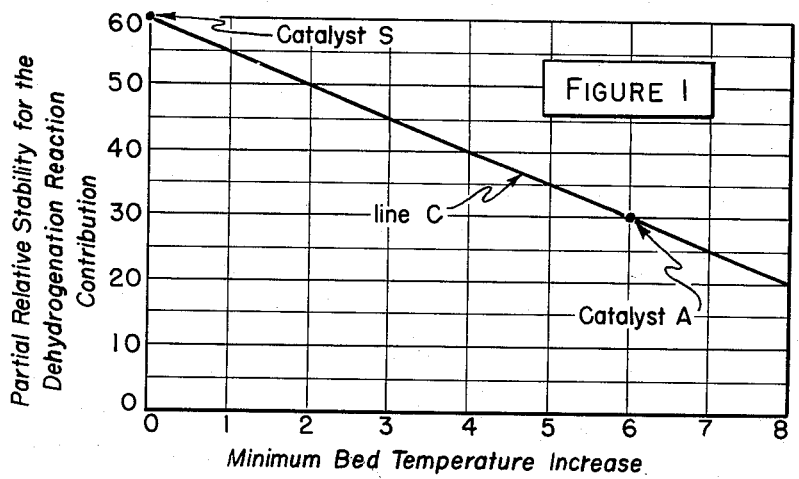
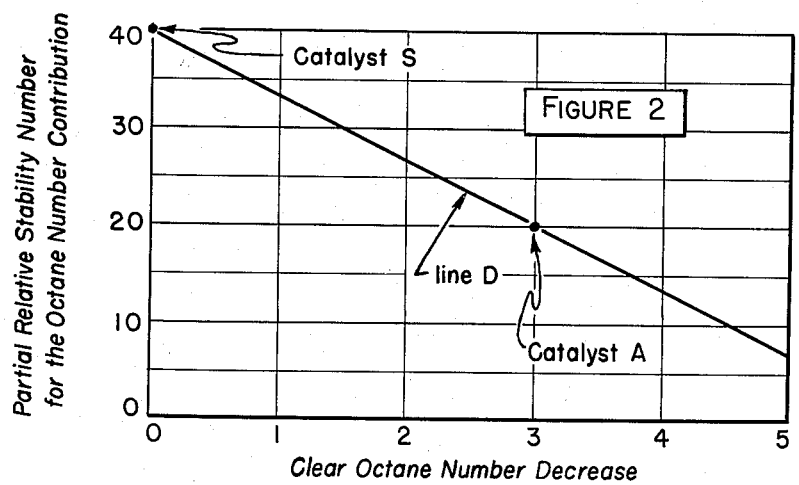

2,989,488
PLATINUM-CONTAINING CATALYSTS AND THEIR PREPARATION
James E. Connor, Jr., Drexel Hill, and Clifford S. Shipley, Aldan, Pa., assignors to The Atlantic Refining Company, Philadelphia, Pa., a corporation of Pennsylvania
Filed June 2, 1954, Ser. No. 434,009
10 Claims. (Cl. 252—455)

This invention relates to platinum-containing catalysts and to their method of preparation and use, and more particularly to platinum-containing catalysts having a high stability prepared from a specific complex compound of platinum and to the use of such catalysts in reforming processes.

Platinum-containing catalysts have long been used industrially for a variety of processes and in recent years have gained even more widespread use, particularly in the petroleum industry in processes for reforming gasoline fractions, dehydrogenation of selected cycloparaffins to produce pure aromatics, isomerization of paraffins, isomerization of alkyl aromatics and similar processes.

It is well-known that the term "reforming" as used in the petroleum industry refers to the treatment of petroleum hydrocarbon fractions boiling in the gasoline range to improve the anti-knock characteristics or octane value thereof, and most frequently the term is applied to the treatment of straight run and thermally cracked gasoline fractions.

Straight run and thermally cracked gasoline fractions are composed of straight chain, slightly branched chain, cyclic paraffins and olefins, all of which have relatively low octane values, together with only minor amounts of aromatics. In order to increase the octane value of the non-aromatic compounds in these low octane fractions, it is desirable to isomerize the straight chain and slightly branched chain hydrocarbons to highly branched chain compounds, and to isomerize the cyclic saturated compounds (naphthenes) to six carbon ring structures which can be dehydrogenated to the corresponding aromatics, the dehydrogenation reaction being especially important since the aromatics so produced contribute markedly to the over-all octane improvement. Another desired reaction is the conversion of paraffins to aromatics by dehydrocyclization. Finally, and of considerable importance, there is the selective cracking of the high molecular weight hydrocarbons to produce high yields of lower molecular weight normally liquid products without the formation of large amounts of gas and coke.

Although many compositions have been proposed as being useful in promoting one or more of the above reactions, only certain platinum impregnated acidic metal oxide component catalysts are known to be capable of successfully promoting all of the desired reactions in a ratio which will give the greatest octane improvement with the lowest loss in yield. One example of such a catalyst contains silica and alumina as the acidic metal oxide component. Other acidic metal oxide components which may be impregnated with platinum for use in this invention include: alumina, silica-zirconia, silica-alumina-zirconia, silica-magnesia, silica-alumina-magnesia, silica-thoria, silica-alumina-thoria, alumina-thoria, and similar oxide combinations. These metal oxide components are characterized by having exchangeable hydrogen ions in their structure. Their preparation and properties have been published widely both in patents and in technical literature, therefore, for purposes of brevity, this information will not be reiterated here. Likewise, the proportions of the various individual oxides which can be combined to produce the acidic metal oxide component may vary over relatively wide ranges as has been set forth in the prior patent and literature art.

Of particular importance to catalytic reforming are those catalysts described in U.S. Patent No. 2,550,531 and U.S. Patent No. 2,651,598. According to the former patent the acidic metal oxide component, prior to platinum impregnation, is treated in a particular manner to lower its surface area so as to permit thereby an increase in the temperature range at which a maximum amount of paraffin isomerization is obtained with the finished catalyst, and so that at the elevated temperatures required for aromatic formation there will not be a loss in paraffin isomerization yield. In other words, the proper ratio or balance between the various reforming reactions is obtained by adjusting the surface area of the acidic metal oxide component to between 10 and 65 square meters per gram.

According to Patent No. 2,651,598, substantially similar objectives are reached by adding an alkali metal compound to the acidic metal oxide component prior to impregnating the component with platinum.

It is necessary when using these catalysts in a reforming operation, however, to have present rather large amounts of hydrogen, which functions to maintain the catalyst in a clean condition, free of coke and carbonaceous deposits which would substantially deactivate the catalyst if allowed to accumulate. Since there is a net production of hydrogen in the over-all reforming reaction, there is no serious problem with respect to hydrogen supply. To make the hydrogen effective, superatmospheric pressures must be used or, in other words, the hydrogen partial pressure must exceed one atmosphere.

The dehydrogenation reaction is one of the most rapid of the reforming reactions and, therefore, under most operating conditions, equilibrium can be readily reached between the naphthenes and the aromatics. Since, however, the volume of the products exceeds the volume of the reactants, the reaction is of course affected by pressure in the reverse direction—that is, the formation of aromatics is decreased as the pressure is raised at a constant reaction temperature. In addition, it is well-known that at a constant pressure, as the reaction temperature is increased, the equilibrium shifts in the direction of higher aromatic production. It follows, therefore, that since it is highly desirable to have the equilibrium as far as possible in the direction of maximum production of aromatics and, since superatmospheric pressures must be used, higher temperatures must also be employed.

To summarize the foregoing: (a) hydrogen at superatmospheric pressures is necessary to maintain the reforming catalyst in a clean condition, (b) dehydrogenation of naphthenes to aromatics produces hydrogen and in addition furnishes an important increment of octane improvement, (c) equilibrium considerations require the use of elevated temperatures to produce the maximum quantities of aromatics and hydrogen at the superatmospheric pressures, and, (d) isomerization reactions must be promoted to a maximum extent within the same range of conditions where maximum aromatic formation is realized. When all four of these requirements are met simultaneously in a reforming process, that is, when all of the desired reactions are in proper ratio one to the other, there results the optimum yield-octane relationship for the process.

Although, as has been noted, several catalysts have been described in the prior art wherein an acidic metal oxide component has been impregnated with platinum, these catalysts have all been subject to a common disadvantage, namely, that their activity declines during use and although in some cases this decline is relatively slow and regenerations with air can be used to extend the life of the catalysts, nevertheless, this decline is sufficient to require complete replacement of the catalysts after a period of use.

In the case of catalytic reforming, the decline in activity is manifested by gradual decline in ability to promote the dehydrogenation reaction, i.e. the conversion of naphthenes to aromatics, and in the ability of the catalyst to promote the isomerization reactions at the temperature levels required for optimum dehydrogenation. This change in activity of the catalyst will result finally in failure to maintain the desired octane level in the product. The measure of a catalyst's resistance to this decline in activity will hereinafter be referred to as its stability.

Since the aforementioned catalysts suffered universally from the same disadvantage, namely, lack of stability, it is reasonable to assume that this characteristic was due to either an inherent property of such catalysts or to a common defect introduced in their preparation. Since preparation of catalysts is often extremely important to their final characteristics, the various methods of preparation which have been described were studied.

Several methods of impregnating various carriers, including the acidic metal oxide components, with platinum have been described in the prior art, the most commonly used method being to contact the carrier material with an aqueous solution of a compound of the metal, such as chloroplatinic acid, ammonium platinum chloride, trimethylbenzyl ammonium platinum chloride, platinous tetramminochloride, dinitro diammino platinum, and similar compounds.

In the case of impregnation with compounds of platinum wherein the platinum is in the anionic portion of the compound, for example, chloroplatinic acid, it is now believed that the impregnation is merely a mechanical deposition. In the case of impregnation with those compounds wherein the platinum is in the cationic portion of the compound, use is made of that fact that the acidic metal oxide component has base exchange properties, i.e., it contains replaceable positive hydrogen ions. It is necessary, however, in order to make use of this property, that the impregnating solution be kept strongly alkaline, preferably above a pH of 9. For example, if a platinous tetramminochloride solution is used, the pH is raised to about 11 by the addition of about eight mols of ammonium hydroxide per mol of the platinum compound, under which conditions the platinum-containing cation replaces the hydrogen ion in the structure of the metal oxide component or carrier.

In all of the prior art preparations the impregnated acidic metal oxide component was either treated with hydrogen at elevated temperatures or with air at elevated temperatures to convert the platinum to the metallic state. These treatments were referred to as reduction with hydrogen or calcination with air. In some instances calcination is referred to as decomposition.

It was noted further that in all of the prior art preparations such ions as halogens, nitrates, sulfides and the like, were brought into contact with the acidic metal oxide component during the platinum impregnation step and that during the subsequent high temperature treatment to produce metallic platinum, whether by hydrogen or air, these residual ions were removed although obviously before their complete removal they were in contact with the impregnated material at temperatures conducive to reactions which could result in lowering the stability of the final catalyst.

It has now been found that by impregnating the acidic metal oxide component with a specific complex compound, it is possible to avoid the presence of the abovementioned deleterious ions and produce a catalyst having a stability markedly greater than that of catalysts prepared according to the prior art methods.

It is therefore an object of this invention to provide platinum impregnated acidic metal oxide catalysts of superior stability.

It is a further object of this invention to provide a method of manufacturing platinum impregnated acidic metal oxide catalysts of superior stability.

It is an additional object of this invention to provide a method of preparing platinum-containing catalysts by impregnating an acidic metal oxide component with a specific complex compound of platinum.

It is an important object of this invention to prepare platinum-coating catalysts by impregnating the reduced surface area components of U.S. Patent No. 2,550,531 and alkali metal treated components of U.S. Patent No. 2,651,598 with a specific complex compound of platinum and utilize such catalysts in catalytic reforming processes.

It is another object of this invention to prepare platinum-containing catalysts by impregnating an acidic metal oxide component with a platinum compound free of ions which reduce the stability of the finished catalyst.

Additional objects of this invention will be found in the following description of the invention.

According to the present invention, one of the abovementioned acidic metal oxide components is contacted with a small excess of an aqueous solution of platinous tetramminohydroxide. This solution and metal oxide component mixture is then heated to an elevated temperature, generally to about the boiling point of the solution, and is held at this temperature for a period of time which may range from about four hours to twenty-four hours. Although, the base exchange reaction between the platinous tetramminohydroxide solution and the acidic metal oxide base is extremely rapid and is practically complete when the oxide has become wetted by the solution, it has been found that by "aging" the carrier in the impregnating solution at an elevated temperature the cationic platinum apparently "migrates" to the most active portions of the acidic metal oxide component, whereby a more active and stable finished catalyst is produced. Generally at temperatures of 210° F. to 212° F. the major portion of the aging effect has occurred at the end of 3 to 4 hours; however, in a few cases some additional improvement has been noted when the heating has been continued up to 18 to 24 hours. It has been noted also that if the temperature is increased, as by heating under super-atmospheric pressures, the aging time can be shortened. If necessary distilled or de-ionized water should be added to the solution during the aging step to replace any water lost by evaporation. After the aging step, the spent solution is drained from the impregnated metal oxide component, then the impregnated component preferably is dried to remove excess moisture, following which step the dried impregnated carrier is subjected to the known methods for decomposing or reducing the platinum complex to produce metallic platinum on the metal oxide component, such as calcination with air or reduction with hydrogen at elevated temperatures.

The compound, platinous tetramminohydroxide, is believed to have the molecular formula:

$$[Pt(NH_3)_4](OH)_2$$

It produces an aqueous solution having a pH generally of about 12 or above. Thus, this solution automatically has the high pH required for base exchange. The cationic platinum rapidly replaces the hydrogen ions in the metal oxide component and the hydrogen ions neutralize the hydroxide ions of the solution. It has been observed that during the impregnation the pH of the solution drops very rapidly. In the case of silica-alumina as the metal oxide component this value will be about 4, which is the characteristic pH produced in water which is in contact with the silica-alumina. It is believed that the high stability of the catalysts prepared according to this invention results from the fact that no undesirable ions such as halides, sulfides, nitrates, or the like are brought into contact with the carrier, which residual ions according to prior art preparation methods were removed in the decomposition step by calcination with air or reduction with hydrogen. This decomposition or reduction step in the present invention is merely for the purpose of producing metallic platinum on the carrier.

The present invention offers an important additional advantage. Since there are no undesirable ions present in the original impregnating solution, and since the only by-product of the impregnation is water, the solution remaining after the impregnation, after fortification with additional platinous tetramminohydroxide, can be used for treating a second batch of acidic metal oxide component. In the case of the prior art impregnation methods, where undesirable ions remained in the spent impregnating solution, it was necessary to first recover the platinum from the spent impregnating solution before it could be used for impregnating a second batch of acidic metal oxide component.

It has been found desirable to use a slight excess of impregnating solution over that required to wet the acidic metal oxide component. In the case where the metal oxide component is in pelleted or granular form, it has been found that about 1.2 cc. of impregnating solution per gram of the metal oxide provides sufficient excess. The concentration of the platinous tetramminohydroxide in the solution can be adjusted according to the desired amount of platinum to be placed on the metal oxide component. It has been found experimentally that for the acidic metal oxide components abovementioned something in excess of 95 percent of the platinum content of the solution is exchanged onto the base. For example, if it is desired to produce a finished catalyst containing about 0.45 percent platinum, an approximately 0.02 molar solution of the platinous tetramminohydroxide should be used with a ratio of 1.2 cc. of solution per gram of metal oxide component.

In the preparation of platinum-containing reforming catalysts, the amount of platinum which is desired on the acid metal oxide component generally ranges from about 0.1 to 2.5 percent. The method of the present invention, however, is obviously not limited to those percentages, since higher or lower percentages can be deposited on the acidic metal oxide merely by adjusting the concentration of the solution of platinous tetramminohydroxide. The platinum ordinarily constitutes a minor portion generally less than 20 percent, and the acidic metal oxide a major portion of the finished catalyst.

As hereinbefore mentioned after the acidic metal oxide component has been impregnated and aged, it is preferably dried at conventional temperatures, such as those ranging between about 212° F. and 325° F., using conventional methods such as tumble drying or drying with hot air or nitrogen, or similar inert gas. Having removed the excess moisture from the impregnated metal oxide component, the next step likewise is conventional for decomposing or reducing the platinum complex to produce metallic platinum on the metal oxide component. For example, this step may be air calcination at temperatures ranging between about 600° F. and 1000° F., but it is preferably carried out between about 650° F. and 750° F. When it is desired to reduce the platinum to the metallic state with hydrogen, temperatures ranging between about 450° F. and 1000° F. may be used.

The invention will be further illustrated in the examples which follow and the drawings. These are given for purposes of illustration only and the invention in its broader aspects is not to be limited thereto.

In the following examples a number of catalysts were prepared both according to prior art methods, and according to the method of the instant invention. In order to show the superior stability of the catalysts of the instant invention, all the catalysts were tested according to a standard reforming test procedure in the laboratory since it was obviously impractical to test every experimental catalyst in a full scale or commercial reforming operation.

In the laboratory reforming stability test a 75 cc. portion of the catalyst is placed in a fixed bed in the form of discrete pellets or granules (8–12 mesh, U.S. standard) and an East Texas distillate having the following properties:

ASTM distillation:
    Overpoint _____° F__ 180
    50 percent _____° F__ 250
    95 percent _____° F__ 330
    Endpoint _____° F__ 365
Clear octane number (ASTM Method D908–51)__ 55
API gravity at 60° F. _____ 56.5 is passed thereover under the following conditions:

Inlet temperature to the catalyst bed and outlet temperature from the catalyst bed is maintained at 875° F. for 24 hours, and then raised to 940° F. for the remainder of the test; hourly liquid space velocity of 3; pressure of 500 pounds per square inch; hydrogen to hydrocarbon mol ratio is 0 to 1. Samples of product are taken at regular time intervals during the run, and their octane numbers determined. The difference in octane number of the product after the catalysts have been on stream for 72 hours and after 200 hours at a constant average catalyst bed temperature is utilized as a part of the measure of the catalyst stability as will be shown hereinafter.

The reactor consisted of a metal tube surrounded by heaters to maintain isothermal conditions. A thermocouple well was placed at the center of the reactor so that the temperature of the catalyst bed could be determined throughout its length. It is a characteristic of the reforming process using a fixed bed reactor with a platinum on metal oxide component type catalyst that at a point near the top of the catalyst bed the temperature of the catalyst will be at a minimum, which temperature is somewhat lower than either the inlet or outlet temperatures heretofore mentioned. The explanation for this minimum in the catalyst bed temperature is relatively simple. As has been noted, one of the most important and also most rapid reactions in catalytic reforming is the dehydrogenation reaction, i.e., the conversion of naphthenes to aromatics. This reaction is highly endothermic, that is, it utilizes rather large amounts of heat. Inasmuch as it is a reaction that proceeds rapidly, it reaches its maximum rate at a point near the top of the catalyst bed and, under the specified experimental conditions, it removes heat faster than it can be supplied with the result there will be a minimum in the temperature "profile" of the catalyst bed at the point where the dehydrogenation reaction is at its maximum. With a catalyst of high stability, since the heat input and other conditions are constant, this "minimum bed temperature," as it will be referred to hereinafter, will remain at nearly a constant value. Obviously, if the catalyst's ability to promote the dehydrogenation reaction declines during its life, less dehydrogenation will occur and therefore less heat will be utilized, with the result the minimum bed temperature will rise. Consequently, the increase in minimum bed temperature gives very important information as to the stability of the catalyst under test.

As noted hereinbefore, the difference in octane value of the product after the catalyst has been on stream for 72 hours and after 200 hours is noted. This difference, while of obvious value in judging stability, might possibly be misleading if used as the sole criterion for stability. It might be misleading for example, if a catalyst started out with good over-all reforming characteristics, but later lost its ability to dehydrogenate while greatly increasing the hydrocracking reaction. The hydrocracking reaction will of course raise octane values, but at the expense of producing large amounts of low molecular weight compounds not useful in gasoline. Thus, in the above example, while the octane decrease might be small indicating a relatively stable catalyst, actually such a catalyst could have relatively poor stability. Therefore, by using a combination of minimum bed temperature change and octane value change over the period of test, a much more reliable and accurate measure of catalyst stability for reforming can be obtained.

The above described test gives an accelerated decrease in stability because of the extremely severe temperature levels used. In commercial plant operation, of course, much lower severities are used hence the decrease in octane number with time and decrease in the dehydrogenation reaction with time are considerably more gradual. Thus, although in the laboratory test octane number declines of several units may be experienced in a 128 hour period, such declines require weeks or months in actual commercial operation. The correlation of the accelerated laboratory stability test has been found to be very good, however, with regular plant runs. Inasmuch as the changes noted in the short time period of the laboratory test require much longer periods in plant scale operation, it follows that small differences between catalysts as measured in the laboratory test will represent large differences in plant operation.

A method has been devised which not only makes use of the difference found between actual catalysts tested in the laboratory and expresses such differences in terms of relative stabilities, but which also compares the relative stabilities of actual catalysts with a theoretical completely stable catalyst as a standard.

If a catalyst were completely stable it would, of course, show neither an octane number decrease nor a minimum bed temperature increase when tested in the above-described laboratory reforming stability test. For purposes of the comparison, this standard or "perfect" catalyst is assigned a total relative stability number of 100. Actual catalysts obviously will have total relative stability numbers less than the theoretical value of 100, since they will show a minimum bed temperature increase and an octane number decrease. It is to be noted, however, that both factors contribute to the total stability of the catalyst, accordingly, a partial relative stability number is given to each, the sum of such partial relative stability numbers being the total relative stability number.

Since, as has been pointed out, dehydrogenation reaction stability is of primary importance, the relative contribution of dehydrogenation reaction stability (measured by minimum bed temperature increase) to the total relative stability is greater than the contribution of the octane number stability to the total relative stability. In order to properly weigh these relative contributions, a value of 60 was selected for the partial relative stability number of the dehydrogenation reaction stability contribution and a value of 40 for the partial relative stability number of the octane number in the case of the standard catalyst. These partial relative stability numbers for actual catalysts are in the same ratio, but obviously less than the standard values of 60 and 40, respectively.

It has been found that a commercially acceptable catalyst when tested by the laboratory method showed a minimum bed temperature increase between the 72nd hour and 200th hour of 6° F., and an octane number decline during the same time period of 3. This present commercially acceptable catalyst was assigned a total relative stability number of 50.

From these data the plots in the accompanying drawings were constructed. In the drawings, FIGURE 1 is a plot of the partial relative stability number for the dehydrogenation reaction contribution (minimum bed temperature increase) versus minimum bed temperature increase as determined in the laboratory reforming stability test.

FIGURE 2 is a plot of the partial relative stability number for the octane number contribution versus the clear octane number decrease as determined in the laboratory reforming stability test.

Referring now to FIGURE 1 of the drawings where the partial relative stability number for the dehydrogenation reaction stability contribution is plotted along the ordinate and the minimum bed temperature increase is plotted along the abscissa, the abovementioned standard catalyst, designated "Catalyst S," is located, of course, at 60 on the ordinate of the plot, as shown. The above-mentioned commercially acceptable catalyst, designated "Catalyst A," which was prepared by impregnating a reduced surface area silica-alumina component with chloroplatinic acid to give a finished catalyst containing 0.45 percent platinum (details of preparation are the same as details for Catalyst No. 1, below, except platinum content) having a minimum bed temperature increase of 6, has a partial relative stability number for the dehydrogenation reaction stability contribution of 30 calculated by: 60/100 (dehydrogenation reaction contribution) times 50 (total relative stability number of commercially acceptable catalyst) equals 30. Thus, the point for Catalyst A on the plot of FIGURE 1 is located.

Referring to FIGURE 2 of the drawings where the partial relative stability number for the octane number stability contribution is plotted along the ordinate and octane decline is plotted along the abscissa, the above-mentioned standard, Catalyst S, is located at 40 on the ordinate of the plot, as shown. The commercially acceptable catalyst, Catalyst A, having an octane number decline of 3, has a partial relative stability number for the octane number contribution of 20 calculated by: 40/100 times 50 equals 20. Thus the point for Catalyst A is located on the plot of FIGURE 2.

Correlation lines, C and D in FIGURES 1 and 2 respectively, are drawn through the points located on the plots. Having determined these lines, the stability of each catalyst can be compared with the stability of every other catalyst by utilizing the data obtained in the standard reforming stability test.

Obviously if the correlation lines are extended below the points for Catalyst A on the plots, they can be used to rate catalysts somewhat poorer than commercially acceptable catalysts.

In order to prepare a series of catalysts for stability comparison, a quantity of a fresh commercial silica-alumina cracking catalyst prepared as described in Example I of U.S. Patent No. 2,550,531, in the form of cylindrical pellets $3/16$ inch in diameter and $3/16$ inch high having a surface area in excess of 400 square meters per gram as determined by the adsorption of nitrogen according to the method of Brunauer, Emmett and Teller found in the Journal of the American Chemical Society, volume 60, pages 309 et seq. (1938), was treated with steam at a pressure of 150 pounds per square inch and at a temperature of 1050° F. until the surface area of the silica-alumina was reduced to about 65 square meters per gram. This low surface area silica-alumina was divided into five portions and used to prepare the five catalysts in the following examples.

EXAMPLE I

A first portion of the reduced surface area silica-alumina component prepared as described above was contacted with an 0.026 molar aqueous chloroplatinic acid solution, 1.2 cc. of solution being used per gram of pellets. This solution was allowed to remain in contact with the silica-alumina for about 24 hours at approximately 210° F. to 212° F. The impregnated pellets of silica-alumina were then dried in a stream of nitrogen at a temperature somewhat above 212° F., following which the platinum was reduced to the metallic state with hydrogen at 450° F. The platinum content of the finished catalyst was 0.48 percent by weight. This catalyst, designated as Catalyst No. 1, corresponds to a commercial reforming catalyst.

EXAMPLE II

A second portion of the reduced surface area silica-alumina component was treated with an 0.0214 molar aqueous solution of platinous tetramminochloride, $$[Pt(NH_3)_4]Cl_2$$

together with sufficient ammonium hydroxide to raise the pH of the solution to 11.1, the amount of solution being 1.2 cc. per gram of silica-alumina. The solution was held in contact with the silica-alumina for 20 hours at 210° F. to 212° F. Then the solution was drained from the impregnated silica-alumina base, and the base dried at a temperature in excess of 250° F. in a stream of nitrogen. Finally, the platinum on the catalyst was reduced to the metallic state with hydrogen at a temperature of about 950° F. This catalyst, Catalyst No. 2, contained 0.454 percent by weight of platinum.

EXAMPLE III

A third portion of the reduced surface area silica-alumina component was treated with an 0.0203 molar aqueous solution of platinous tetramminohydroxide, $$[Pt(NH_3)_4](OH)_2$$

for 18 hours at 212° F. The amount of solution used was 1.2 cc. per gram of silica-alumina. The solution was drained from the impregnated silica-alumina component and the component then was dried in a stream of nitrogen at a temperature in excess of 250° F. The platinum was reduced to the metallic state with hydrogen at about 950° F. The finished catalyst contained about 0.465 percent of platinum by weight and is designated as Catalyst No. 3.

EXAMPLE IV

A fourth portion of the reduced surface area silica-alumina component was treated with platinous tetramminohydroxide by the method described in Example III to give a finished catalyst, Catalyst No. 4 having 0.355 percent by weight of platinum.

EXAMPLE V

A fifth portion of the reduced surface area silica-alumina component was contacted with an 0.0276 molar aqueous solution of platinous tetramminohydroxide in the proportions of 1.2 cc. of solution per gram of silica-alumina component. The solution was held in contact with the component for 18 hours at 212° F. The impregnated silica-alumina pellets were drained and dried at 250° F., then the dried impregnated pellets were calcined with air at a temperature of 650° F. to 700° F. for two hours. The finished catalyst, Catalyst No. 5, contained 0.620 weight percent of platinum.

Each of the catalysts prepared above was tested by the above described laboratory reforming stability test. It should be noted that each of the catalysts raised the clear octane number of the standard charge stock from 55 to 92 (at the 72 hour point) as measured by ASTM Method D908-51. The results of the test and the stabilities found from FIGURES 1 and 2 for the catalysts are set forth in Table I.

*Table I*

| Catalyst Number | Impregnating Compound and Platinum Content of Finished Catalyst | Decrease in Octane No. | Increase in Minimum Bed Temperature, °F. | Total Stability Number |
|---|---|---|---|---|
| 1 | $H_2PtCl_6$ 0.48% Pt | 2.5 | 6 | 53 |
| 2 | $[Pt(NH_3)_4]Cl_2$ 0.454% Pt | 4.0 | 6 | 43 |
| 3 | $[Pt(NH_3)_4](OH)_2$ 0.465% Pt | 2.0 | 1 | 82 |
| 4 | $[Pt(NH_3)_4](OH)_2$ 0.355% Pt | 3.1 | 2 | 69 |
| 5 | $[Pt(NH_3)_4](OH)_2$ 0.62% Pt | 1.4 | 1 | 86 |

It is evident from the above data that the use of platinous tetramminohydroxide for impregnating an acidic metal oxide component produces a catalyst having a very markedly improved stability. For example, a catalyst of the present invention shows a 60 percent increase in stability over present commercially acceptable catalysts prepared by impregnation with chloroplatinic acid, comparing Catalyst Nos. 3 and 5 with Catalyst No. 1. The catalysts of the present invention show a 95 percent increase in stability over catalysts prepared by impregnation with platinous tetramminochloride, Catalyst No. 2.

The data also show that a catalyst prepared according to the instant invention is 30 percent more stable than a commercial catalyst containing over 30 percent more platinum, comparing Catalyst No. 4 with Catalyst No. 1. Consequently, the present invention permits very important savings in catalyst cost both by using less platinum on the catalyst and by providing catalysts having greatly increased life.

The method of the instant invention has been found to be effective in the preparation of reforming catalysts for treatment of petroleum distillates, such as light hydrocarbons, naphtha, gasoline and kerosine, and particularly gasoline fractions. The fractions may have an initial boiling point within the range of 50° F. to 90° F. and an end boiling point of about 425° F. to 560° F.

It is preferred when reforming petroleum distillates boiling in the gasoline-kerosine range to impregnate a silica-alumina metal oxide component having a surface area within the range of 10 to 65 square meters per gram with platinous tetramminohydroxide to give a platinum content of from 0.1 percent to 2.5 percent by weight of the finished catalyst, the catalyst after impregnation being finished by the conventional methods outlined above. The reforming conditions for such charge stocks and with such catalysts include reaction temperatures within the range of 600° F. to 1000° F., pressures of from 100 to 1000 pounds per square inch, liquid hourly space velocities of from 0.1 to 10 and hydrogen to hydrocarbon mol ratios of from 1 to 20 mols of hydrogen per mol of hydrocarbon.

The method of the instant invention has been found to be effective in preparation of catalysts using acidic metal oxide components having surface areas not only in the 10 to 65 square meter per gram range specified in the abovementioned patent, U.S. No. 2,550,531, but also acidic metal oxide components having surface areas greatly in excess of the 65 square meter per gram area, including unaltered components and acidic metal oxide components which have been combined with an alkali metal compound.

While the catalysts of the present invention are particularly useful in reforming processes, it is understood that they may be used in any process in which platinum-containing catalysts are utilized. They may be used in the cracking of normally gaseous or normally liquid hydrocarbons, dehydrogenation of cyclic paraffins to aromatics, isomerization of organic compounds particularly the paraffinic and alkyl aromatic hydrocarbons, hydrogenation of unsaturated hydrocarbons to produce the corresponding saturated hydrocarbons, hydrogenation of unsaturated alcohols, aldehydes, ketones, acids, etc. Other reactions in which these catalysts may prove useful include oxidation, condensation, polymerization and the like.

We claim:

1. A method of manufacturing a catalyst which comprises impregnating an acidic metal oxide component with an aqueous solution of platinous tetramminohydroxide, aging the impregnated acidic metal oxide component for at least three hours at a temperature of from about 210° F. to about 212° F., drying the impregnated acidic metal oxide component and converting the platinum impregnated on the acidic metal oxide component to the metal, the amount of platinum ranging between 0.1 percent and 2.5 percent by weight of the final catalyst.

2. A method of manufacturing a catalyst which comprises contacting an acidic metal oxide component with an aqueous solution of platinous tetramminohydroxide at a temperature of from about 210° F. to about 212° F. for at least three hours to impregnate the acidic metal oxide component, drying the impregnated acidic metal oxide component and converting the platinum impregnated on the acidic metal oxide component to the metal, the amount of platinum ranging between 0.1 percent and 2.5 percent by weight of the final catalyst.

3. A method of manufacturing a catalyst which comprises impregnating silica-alumina with an aqueous solution of platinous tetramminohydroxide, aging the impregnated silica-alumina for at least three hours at a temperature of from about 210° F. to about 212° F., drying the impregnated silica-alumina and converting the platinum impregnated on the silica-alumina to the metal, the amount of platinum ranging between 0.1 percent and 2.5 percent by weight of the final catalyst.

4. A method of manufacturing a catalyst which comprises contacting silica-alumina with an aqueous solution of platinous tetramminohydroxide at a temperature of from about 210° F. to about 212° F. for at least three hours to impregnate the silica-alumina, drying the impregnated silica-alumina and converting the platinum impregnated on the silica-alumina to the metal, the amount of platinum ranging between 0.1 percent and 2.5 percent by weight of the final catalyst.

5. The catalyst prepared by the method of claim 4.

6. A method of manufacturing a catalyst which comprises contacting a silica-alumina component whose surface area has been reduced with an aqueous solution of platinous tetramminohydroxide at a temperature of from about 210° F. to about 212° F. for at least three hours to impregnate the silica-alumina, drying the impregnated silica-alumina and converting the platinum impregnated on the silica-alumina to the metal, the amount of platinum ranging between 0.1 percent and 2.5 percent by weight of the final catalyst.

7. In the preparation of a supported platinum-containing catalyst comprising a major amount of a chloride-free carrier and a minor amount between 0.1 and 1 percent platinum the improvement which comprises impregnating the carrier with an aqueous solution of tetrammine platinous hydroxide, drying, and calcining to decompose said compound leaving the carrier impregnated with platinum.

8. A process according to claim 7 in which the carrier is an aluminous carrier.

9. A process according to claim 7 in which the carrier is non-acidic and the resulting catalyst is devoid of any appreciable isomerization activity.

10. A process according to claim 7 in which the carrier is an acidic cracking catalyst and the resulting catalyst possesses substantial activity for the isomerization of hydrocarbons.

References Cited in the file of this patent

UNITED STATES PATENTS

| | | |
|---|---|---|
| 2,550,531 | Ciapetta | Apr. 24, 1951 |
| 2,623,860 | Haensel | Dec. 30, 1952 |
| 2,635,080 | Appell | Apr. 14, 1953 |
| 2,834,740 | Johnson et al. | May 13, 1958 |

FOREIGN PATENTS

| | | |
|---|---|---|
| 516,099 | Belgium | Dec. 31, 1953 |
| 1,071,285 | France | Mar. 3, 1954 |

OTHER REFERENCES

J. Chem. Soc. of Japan, vol. 6 of 1939, pages 1031–1036.

UNITED STATES PATENT OFFICE

CERTIFICATE OF CORRECTION

Patent No. 2,989,488                        June 20, 1961

James E. Connor, Jr., et al.

It is hereby certified that error appears in the above numbered patent requiring correction and that the said Letters Patent should read as corrected below.

Column 4, line 9, for "platinum-coating" read -- platinum-containing --; column 6, line 22, for "0 to 1" read -- 10 to 1 --.

Signed and sealed this 21st day of November 1961.

(SEAL)
Attest:

ERNEST W. SWIDER
Attesting Officer

DAVID L. LADD
Commissioner of Patents

USCOMM-DC